(12) United States Patent
Osakabe et al.

(10) Patent No.: US 12,475,195 B2
(45) Date of Patent: Nov. 18, 2025

(54) SYSTEM AND METHOD FOR GENERATING CANDIDATE IDEA

(71) Applicant: Hitachi, Ltd., Tokyo (JP)

(72) Inventors: Yoshihiro Osakabe, Tokyo (JP); Akinori Asahara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/272,233

(22) PCT Filed: Feb. 25, 2022

(86) PCT No.: PCT/JP2022/008022
§ 371 (c)(1),
(2) Date: Jul. 13, 2023

(87) PCT Pub. No.: WO2022/196301
PCT Pub. Date: Sep. 22, 2022

(65) Prior Publication Data
US 2024/0078290 A1      Mar. 7, 2024

(30) Foreign Application Priority Data

Mar. 19, 2021 (JP) ................................ 2021-045937

(51) Int. Cl.
*G06F 18/22* (2023.01)
*G06F 17/16* (2006.01)

(52) U.S. Cl.
CPC .............. *G06F 18/22* (2023.01); *G06F 17/16* (2013.01)

(58) Field of Classification Search
CPC .................................. G06F 18/22; G06F 17/16
(Continued)

(56) References Cited

U.S. PATENT DOCUMENTS

| 8,396,870 B2 * | 3/2013 | Birdwell ........... G06F 16/24578 707/758 |
| 10,824,661 B1 * | 11/2020 | Huang ................ G06F 16/3331 |

(Continued)

FOREIGN PATENT DOCUMENTS

JP      2020-095452 A      6/2020

OTHER PUBLICATIONS

International Search Report, with translation, and Written Opinion received in co-pending International Application No. PCT/JP2022/008022, mailed Apr. 12, 2022, in 8 pages.
(Continued)

*Primary Examiner* — Cam Linh T Nguyen
(74) *Attorney, Agent, or Firm* — PROCOPIO, CORY, HARGREAVES & SAVITCH LLP

(57) ABSTRACT

A system converts a first input idea vector representing an idea into a first contracted vector. The system generates one or more second contracted vectors in a multivariate space to which the first contracted vector belongs, based on a value of a first predetermined component of the first contracted vector in the multivariate space. The system generates, respectively from the one or more second contracted vectors, one or more first output idea vectors representing a candidate idea to be proposed to a user. The multivariate space is configured to maintain a similarity between an input idea vector for generating a contracted vector and an output idea vector generated from the contracted vector and a similarity between the first predetermined component of the contracted vector and a first predetermined index value.

10 Claims, 14 Drawing Sheets

(58) Field of Classification Search
USPC .......................................................... 707/758
See application file for complete search history.

(56) References Cited

U.S. PATENT DOCUMENTS

| | | | |
|---|---|---|---|
| 11,379,718 B2 * | 7/2022 | Desmond | G06F 18/2433 |
| 11,409,752 B1 * | 8/2022 | Qadrud-Din | G06F 40/126 |
| 11,971,963 B2 * | 4/2024 | Eser | G06F 18/22 |
| 12,271,796 B2 * | 4/2025 | Louizos | G06N 20/10 |
| 2006/0101060 A1 * | 5/2006 | Li | G06F 16/90335 |
| | | | 707/E17.02 |
| 2018/0137390 A1 * | 5/2018 | Brundage | G06F 18/28 |
| 2019/0347281 A1 * | 11/2019 | Natterer | G06F 16/3344 |
| 2020/0193090 A1 | 6/2020 | Takeuchi et al. | |
| 2020/0380338 A1 * | 12/2020 | Matsumura | G06F 18/22 |
| 2021/0097737 A1 * | 4/2021 | Kim | G06T 11/006 |
| 2022/0245440 A1 * | 8/2022 | Subramanian | G06F 9/3836 |
| 2022/0383994 A1 * | 12/2022 | Rabideau | G16C 20/70 |
| 2023/0139567 A1 * | 5/2023 | Jia | G06N 3/09 |
| | | | 706/25 |

OTHER PUBLICATIONS

Blaschke, Thomas, et al., "Application of generative autoencoder in de nova molecular design", arXiv:1711.078391v1 [cs.LG] Nov. 21, 2017, in 13 pages.
European Patent Office, Extended European Search Report, Application No. 22771057.1, dated Feb. 4, 2025, in 13 pages.

* cited by examiner

[FIG. 1]
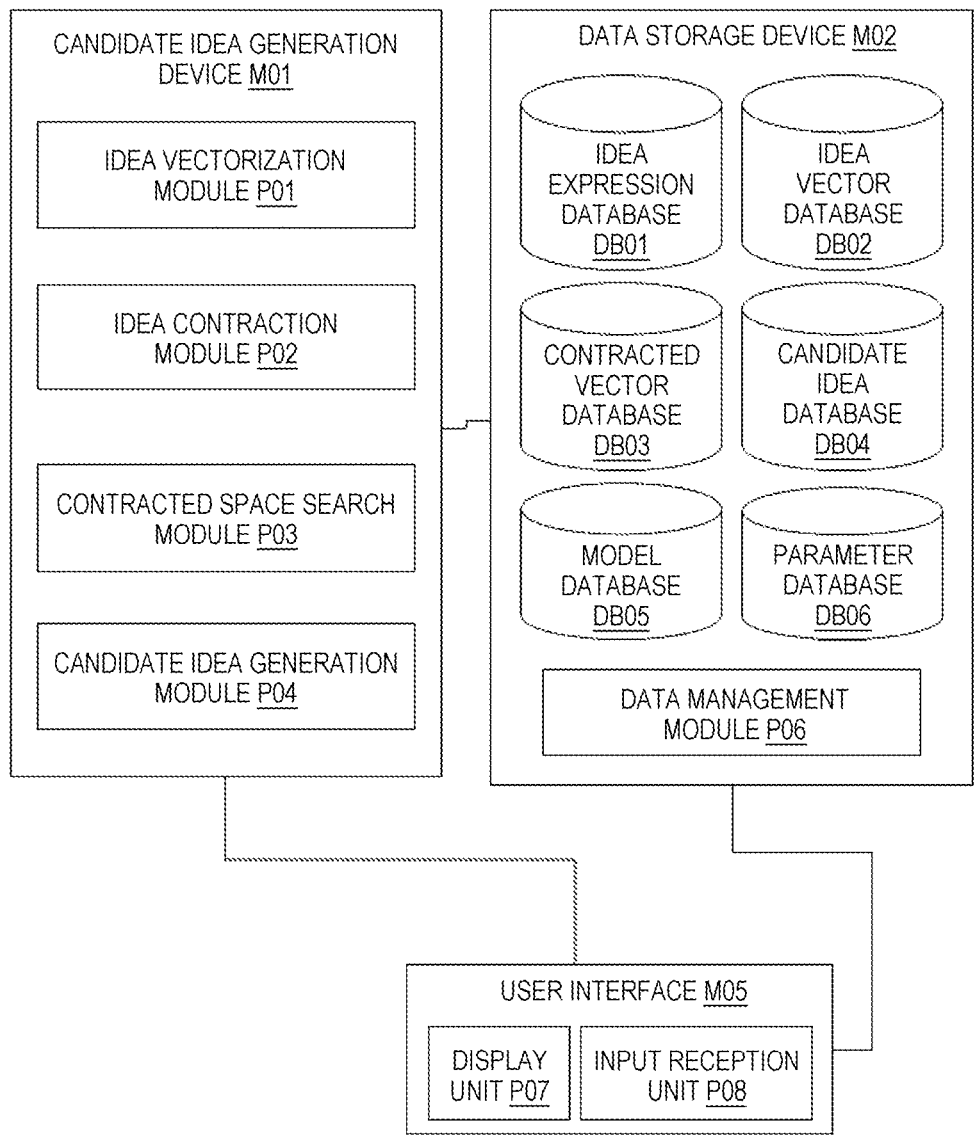

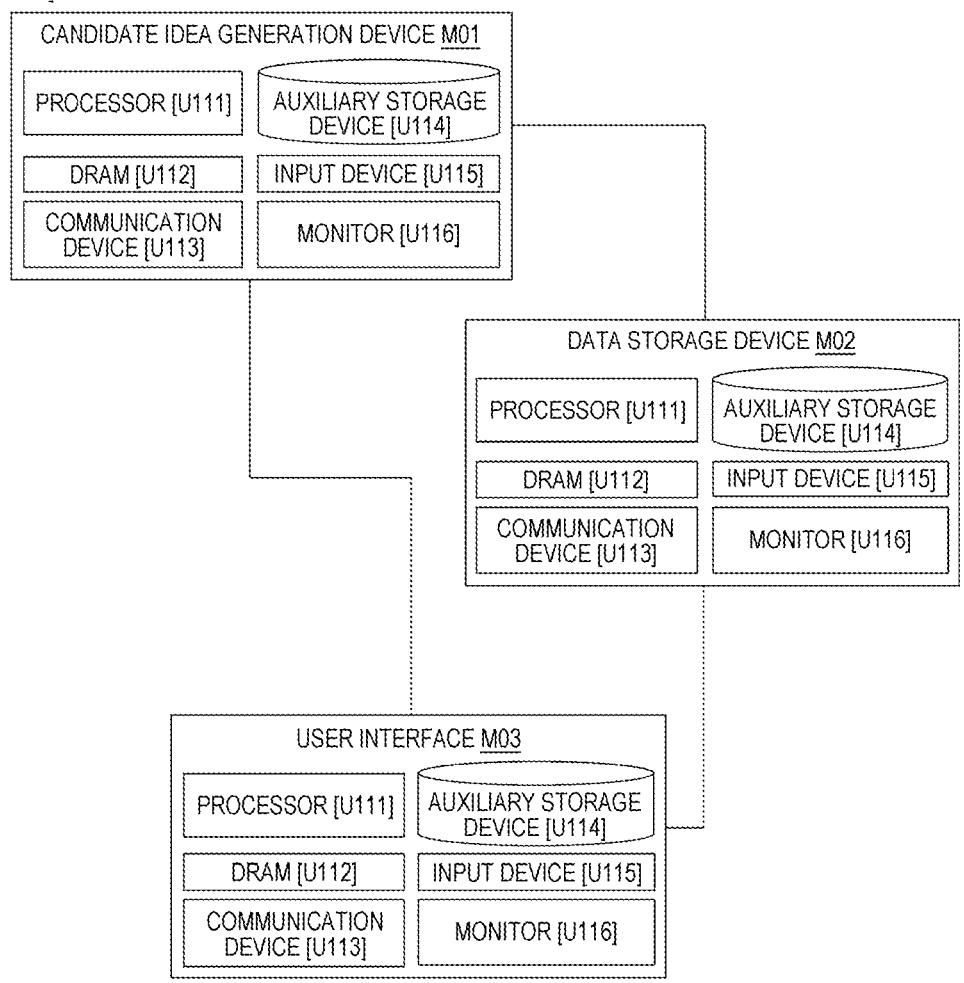
[FIG. 2]

[FIG. 3]

```
              PARAMETER DB DB06                    61
{
  "TableNames": ["Tbl_Cat_001"],
  "TargetProperties": [
        {"mwt":
                {
                  "CorrDimIndex": 0,
                  "CorrDir": "positive",
                  "TargetValue": 1.6,
                  "FilteringRange": 0.2,
                  "SearchRange": 0.03,
                  ...
                }                                   62
        },
        {"logP":
                {
                  "CorrDimIndex": 1,
                  "CorrDir": "negative",
                  "TargetValue": -1.5,
                  "FilteringRange": 0.2,
                  "SearchRange": 0.0128,
                  ...
                }
        }
  ],
  "VAEInitialParams": [
        "EncoderLayers":
          [{"layer11": {...},
            "layer12": {...}}
          ],                                        63
        "DecoderLayers":
          [{"layer21": {...},
            "layer22": {...}}
          ],
        "LatentDim": [196],
        .....
  ],                                                64
  "SearchParams":{ "threshold": 0.4, "threshold_time": "30days"},
  ......
}
```

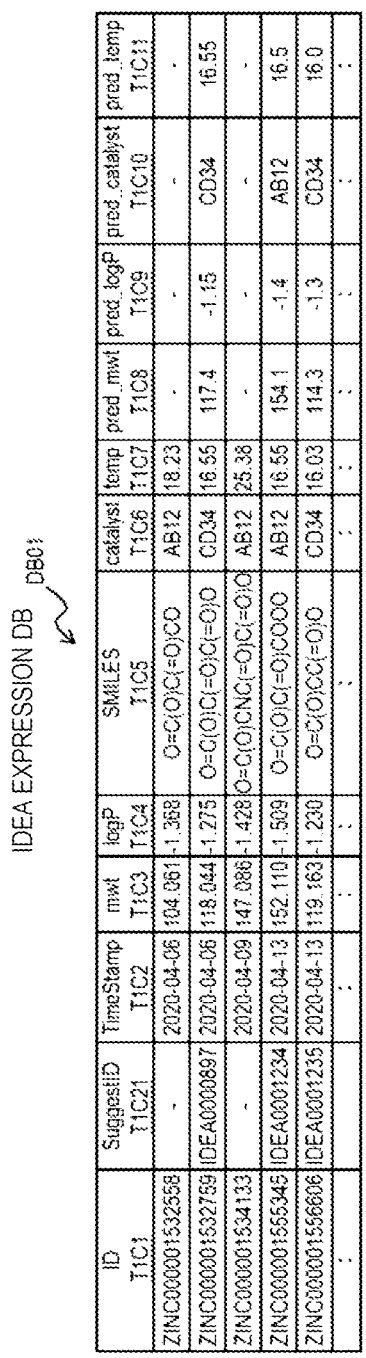
[FIG. 4]

[FIG. 5]
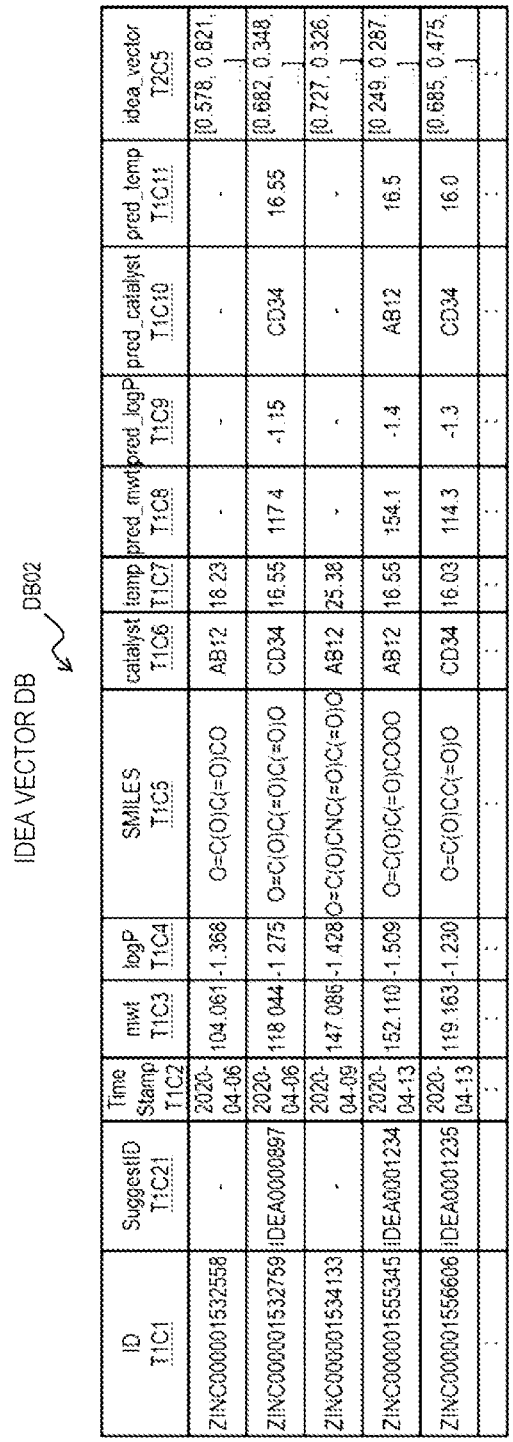

[FIG. 6]
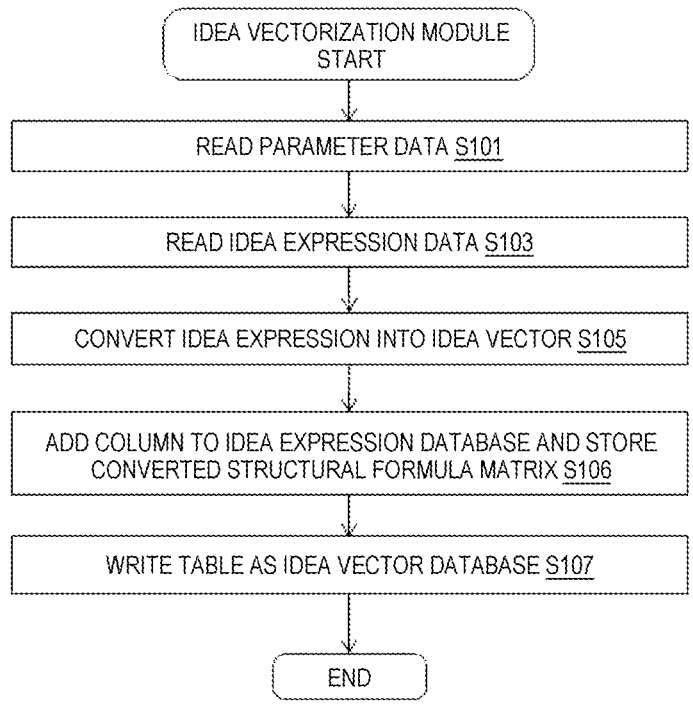
[FIG. 7]
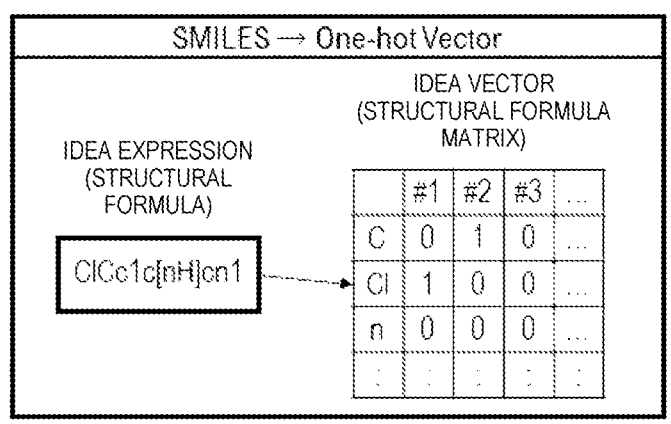

[FIG. 8]

CONTRACTED VECTOR DATABASE DB03

| ID T1C1 | SuggestID T1C21 | TimeStamp T1C2 | mwt T1C3 | logP T1C4 | SMILES T1C5 | catalyst T1C6 |
|---|---|---|---|---|---|---|
| ZINC000001532558 | - | 2020-04-06 | 104.061 | -1.368 | O=C(O)C(=O)CO | AB12 |
| ZINC000001532759 | IDEA0000897 | 2020-04-06 | 118.044 | -1.275 | O=C(O)C(=O)C(=O)O | CD34 |
| ZINC000001534133 | - | 2020-04-09 | 147.086 | -1.428 | O=C(O)CNC(=O)C(=O)O | AB12 |
| ZINC000001555345 | IDEA0001234 | 2020-04-13 | 152.110 | -1.509 | O=C(O)C(=O)COOO | AB12 |
| ZINC000001556606 | IDEA0001235 | 2020-04-13 | 119.163 | -1.230 | O=C(O)CC(=O)O | CD34 |
| ⋮ | ⋮ | ⋮ | ⋮ | ⋮ | ⋮ | ⋮ |

| temp T1C7 | pred_mwt T1C8 | pred_logP T1C9 | pred_cataly st T1C10 | pred_temp T1C11 | idea_vector T2C5 | abst_vector T3C5 |
|---|---|---|---|---|---|---|
| 18.23 | - | - | - | - | [0.578, 0.821, ...] | [0.487, 0.628, ...] |
| 16.55 | 117.4 | -1.15 | CD34 | 16.55 | [0.682, 0.348, ...] | [0.321, 0.542, ...] |
| 25.38 | - | - | - | - | [0.727, 0.326, ...] | [0.627, 0.597, ...] |
| 16.55 | 154.1 | -1.4 | AB12 | 16.5 | [0.249, 0.287, ...] | [0.498, 0.873, ...] |
| 16.03 | 114.3 | -1.3 | CD34 | 16.0 | [0.685, 0.475, ...] | [0.775, 0.735, ...] |
| ⋮ | ⋮ | ⋮ | ⋮ | ⋮ | ⋮ | ⋮ |

[FIG. 9]
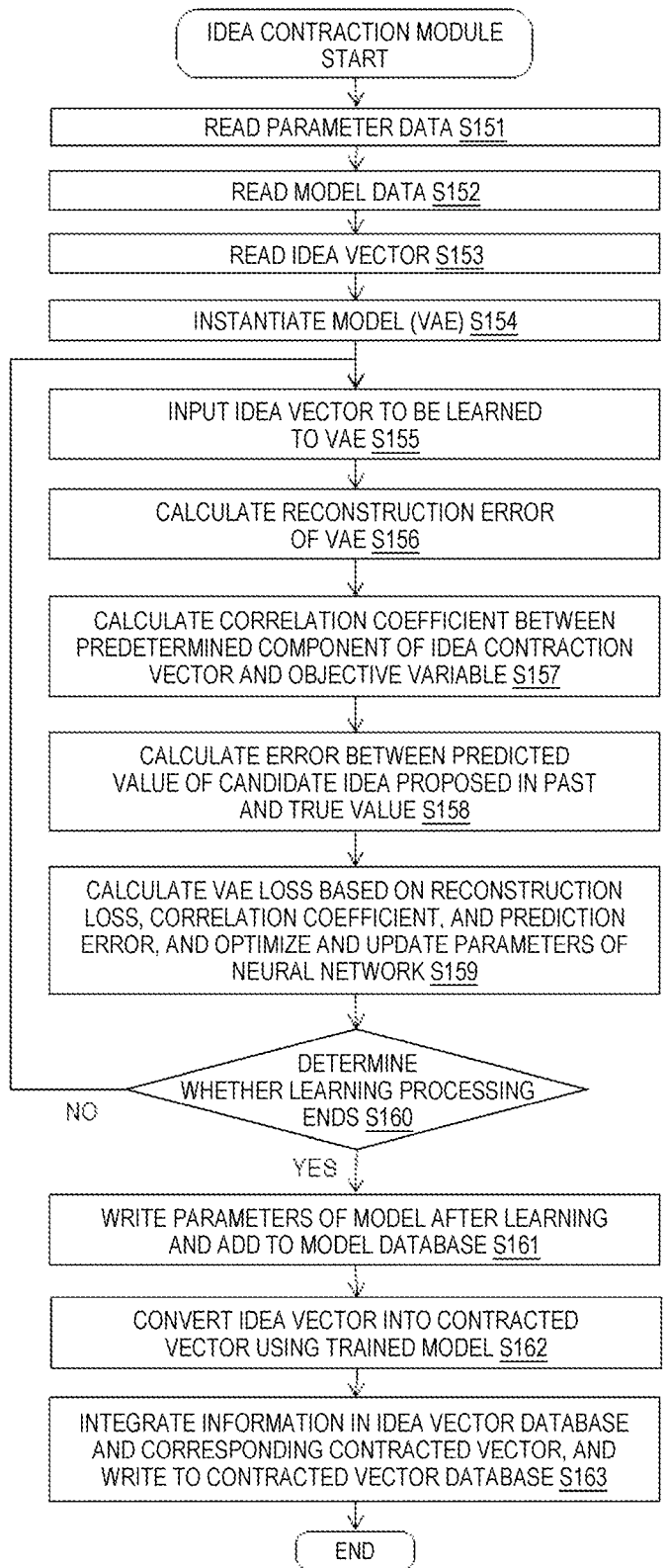

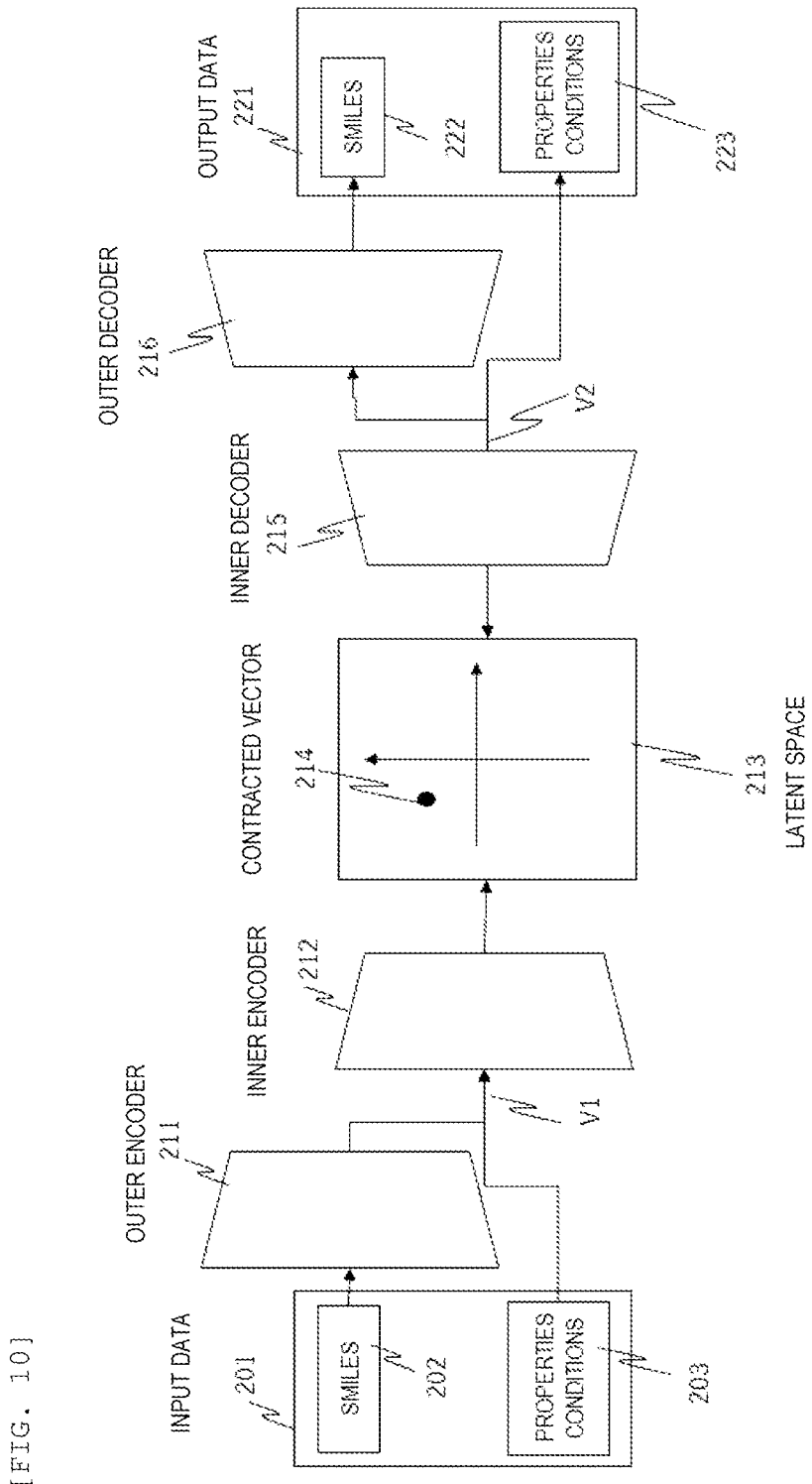
[FIG. 10]

[FIG. 11]
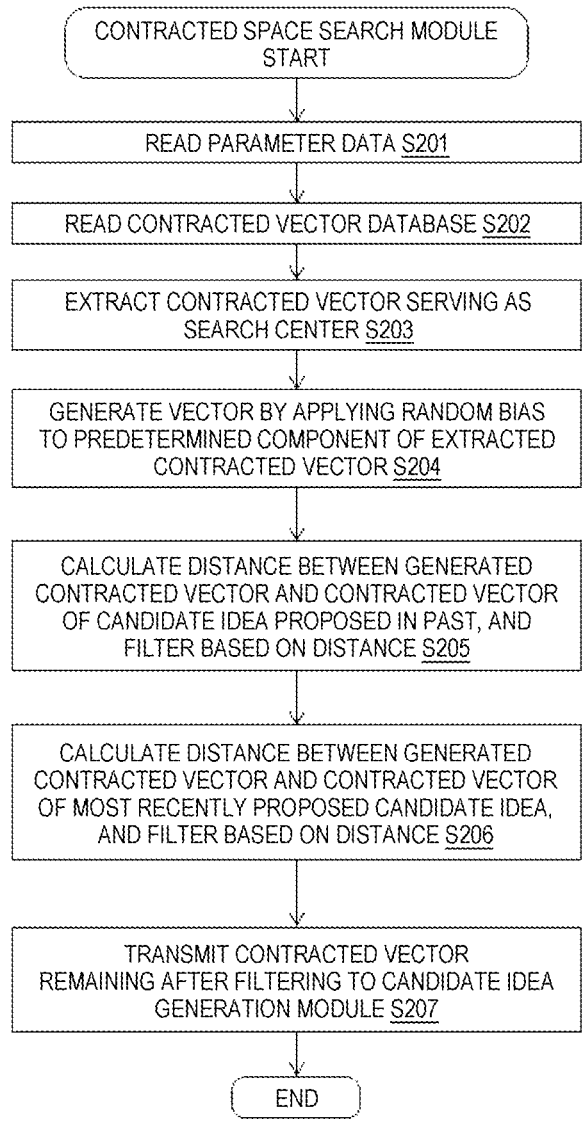

[FIG. 12]
CANDIDATE IDEA DATABASE DB04
| SuggestID T4C1 | SuggestDate T4C2 | pred_mwt T4C3 | pred_logP T4C4 | SMILES T4C5 | pred_catalyst T4C6 | pred_temp T4C7 |
|---|---|---|---|---|---|---|
| IDEA0001234 | 2020-04-11 | 154.1 | -1.4 | O=C(O)C(=O)COO | AB12 | 16.5 |
| IDEA0001235 | 2020-04-11 | 114.3 | -1.3 | O=C(O)CC(=O)O | CD34 | 16.0 |
| IDEA0001236 | 2020-04-12 | 143.9 | -1.6 | O=C(O)CNC(=O)O | AB12 | 22.5 |
| IDEA0001237 | 2020-04-17 | 90.7 | -1.2 | CNC(=O)C(N)=O | CD34 | 26.0 |
| IDEA0001238 | 2020-04-17 | 131.4 | -1.1 | NC(=O)N1CC1 | CD34 | 28.5 |
| ... | ... | ... | ... | ... | ... | ... |

[FIG. 13]
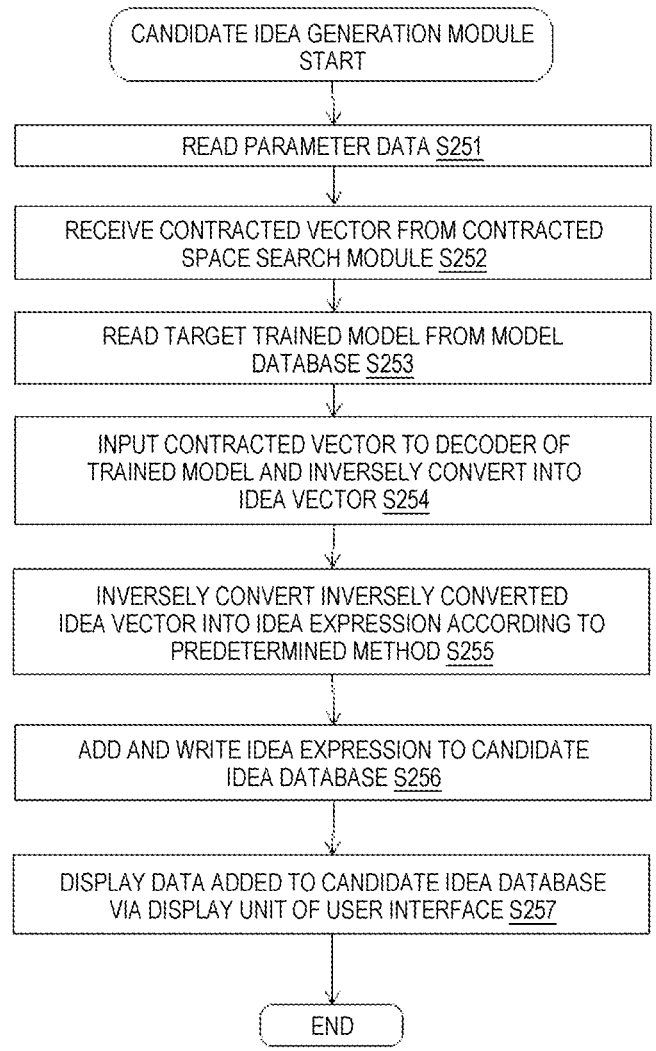

[FIG. 14A]
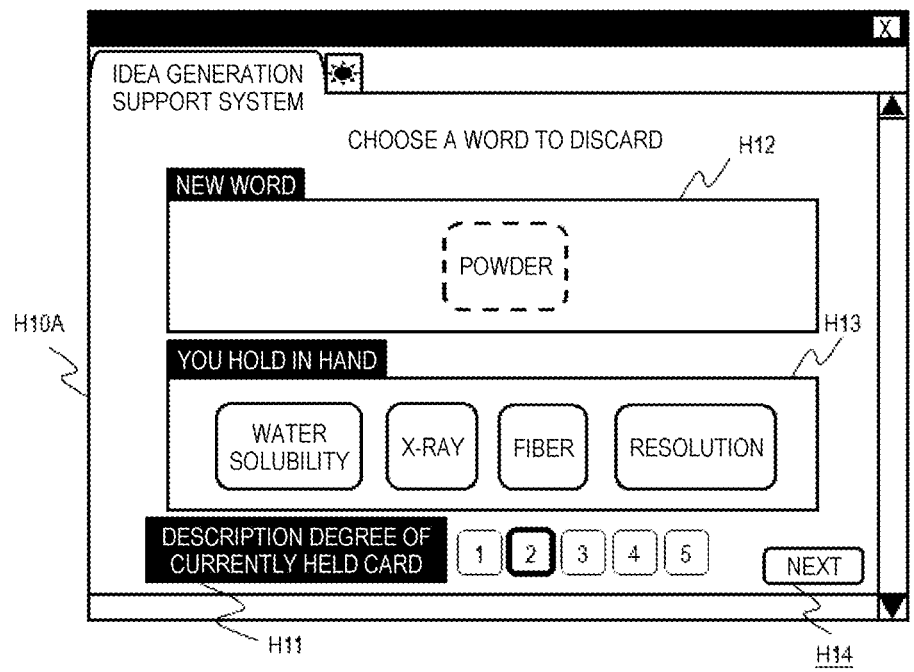
[FIG. 14B]
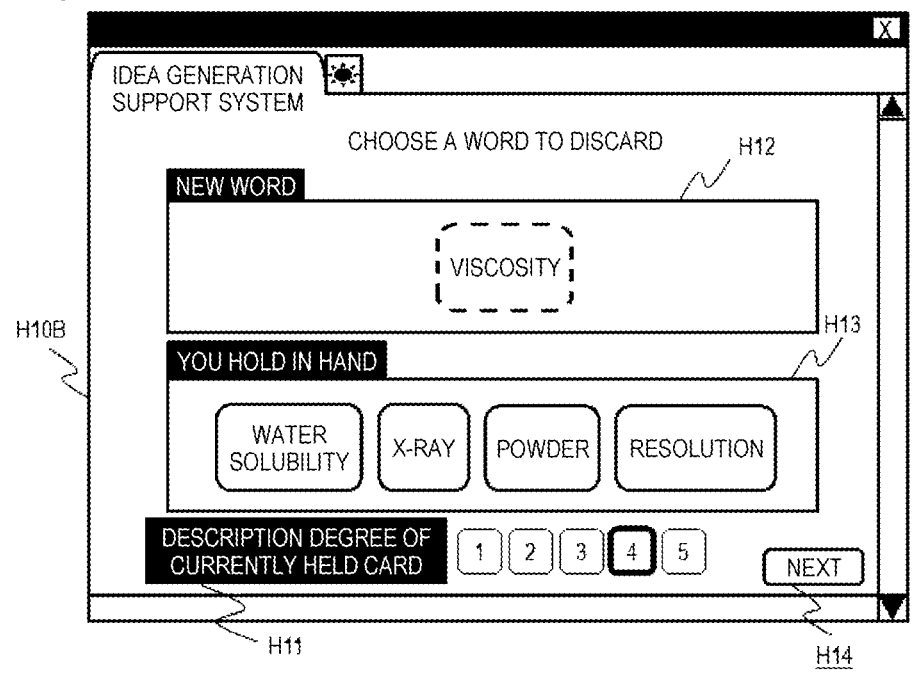

[FIG. 15]
EVALUATION RESULT TABLE  T80
| STEP T6C1 | WORD T6C2 | | | | | | | ... | EVALUATION INDEX T6C2 | |
|---|---|---|---|---|---|---|---|---|---|---|
| | POWDER | X-RAY | WATER SOLUBILITY | COAGULATION | FIBER | VISCOSITY | RESOLUTION | ... | DIFFERENCE EVALUATION T6C5 | ABSOLUTE EVALUATION T6C6 |
| ... | ... | ... | ... | ... | ... | ... | ... | ... | | |
| 1 | 0 | 1 | 1 | 0 | 1 | 0 | 1 | ... | | |
| 2 | 1 | 1 | 1 | 0 | 0 | 0 | 1 | ... | | |
| ... | ... | ... | ... | ... | ... | ... | ... | ... | | |
[FIG. 16]
WORD VECTOR 
| ID | WORD | | | | | | | ... |
|---|---|---|---|---|---|---|---|---|
| | POWDER | X-RAY | WATER SOLUBILITY | COAGULATION | FIBER | VISCOSITY | RESOLUTION | ... |
| 1 | 1 | 1 | 1 | 0 | 0 | 1 | 0 | ... |
| 2 | 1 | 1 | 0 | 1 | 0 | 1 | 0 | ... |
| 3 | 1 | 1 | 0 | 0 | 0 | 1 | 1 | ... |
| ... | ... | ... | ... | ... | ... | ... | ... | ... |

SYSTEM AND METHOD FOR GENERATING CANDIDATE IDEA

CROSS-REFERENCE TO RELATED APPLICATIONS

The present application claims priority from Japanese Patent Application No. 2021-045937 filed on Mar. 19, 2021, contents of which are incorporated into the present application by reference.

TECHNICAL FIELD

The present invention relates to a system for generating a candidate idea.

BACKGROUND ART

A mechanism aiming at improving system efficiency, intellectual productivity, and the like by digitizing and quantitatively analyzing real-world observation data in a cyberspace is called a cyber-physical system (CPS). In recent years, with maturation of sensing techniques such as the Internet of things (IoT) and computing techniques capable of collecting and analyzing large amounts of data, it has become possible to more tightly link a cyberspace and a physical space.

In particular, optimization of a system using the CPS is implemented by alternately performing a phase of planning a measure to improve a current situation and a phase of observing what actually happens when the improvement measure is taken. By evaluating an observation result, that is, a quality of an idea, and providing feedback, a more effective improvement measure is to be proposed in the next planning phase.

In recent years, a technique has been proposed in which an idea with a high probability of improvement is presented as a candidate measure in advance using, in this planning phase, an interpolation search method using artificial intelligence technology. For example, Bayesian optimization is a method of determining an idea to be tested next based on an expected value calculated from known information. JP2020-95452A discloses a method using Bayesian optimization to search for a candidate compound to be tested next in material development.

SUMMARY OF INVENTION

Technical Problem

The current artificial intelligence technology is mainly an interpolation search method based on known information. This is a search method strongly depending on an initial value. That is, when a past trial condition is biased, a candidate idea to be tested next is too similar to a past trial, resulting in a lack of diversity of the idea.

For example, when an effect of improving a current situation and an economic effect of an idea discovered after trial and error are extremely high, sufficient profits can be recovered when some cost is required for the trial of the idea. In such a case, it seems more efficient to try an idea that has not been tried so far, rather than the interpolation search method. However, since simple random search or the like does not consider past trial results, search efficiency may also be poor.

Therefore, when searching for a candidate idea whose quality is to be evaluated next time, there is a demand for a technique of searching for a candidate idea in consideration of both novelty of the candidate idea and the quality of the candidate idea predicted based on known data.

Solution to Problem

According to an aspect of the invention, there is provided a system for generating a candidate idea to be evaluated next, and the system includes: one or more processors; and one or more storage devices configured to store programs to be executed by the one or more processors. The one or more processors convert a first input idea vector representing an idea into a first contracted vector, generate one or more second contracted vectors in a multivariate space to which the first contracted vector belongs, based on a value of a first predetermined component of the first contracted vector in the multivariate space, and generate, respectively from the one or more second contracted vectors, one or more first output idea vectors representing a candidate idea to be proposed to a user. The multivariate space is configured to maintain a similarity between an input idea vector for generating a contracted vector and an output idea vector generated from the contracted vector and a similarity between the first predetermined component of the contracted vector and the first predetermined index value.

Advantageous Effects of Invention

According to the aspect of the invention, it is possible to generate, based on novelty and a quality of a candidate idea, the candidate idea to be evaluated in the next trial.

BRIEF DESCRIPTION OF DRAWINGS

FIG. 1 shows an example of a logical configuration of a candidate idea proposal system according to an embodiment of the present description.

FIG. 2 shows a hardware configuration example of a candidate idea generation device, a data storage device, and a user interface.

FIG. 3 shows an example of parameter data included in a parameter database.

FIG. 4 shows a configuration example of an idea expression database.

FIG. 5 shows a configuration example of an idea vector database.

FIG. 6 is a flowchart of a processing example of an idea vectorization module.

FIG. 7 shows an example of generating a structural formula vector, which is an idea vector, from a chemical structural formula, which is an idea expression.

FIG. 8 shows a configuration example of a contracted vector database.

FIG. 9 is a flowchart showing a processing example of an idea contraction module.

FIG. 10 shows a configuration example of a variable auto-encoder.

FIG. 11 is a flowchart showing a processing example of a contracted space search module.

FIG. 12 shows a configuration example of a candidate idea database.

FIG. 13 is a flowchart of a processing example of a candidate idea generation module.

FIG. 14A shows an example of a user interface (screen) of an idea generation support application according to Embodiment 2.

FIG. 14B shows an example of the user interface (screen) of the idea generation support application according to Embodiment 2.

FIG. 15 shows a configuration example of an evaluation result table.

FIG. 16 shows an example of a word vector.

DESCRIPTION OF EMBODIMENTS

In the following description, description may be divided into a plurality of sections or examples when necessary for convenience. Unless particularly specified, the sections or examples are not independent of each other, but have a relation in which a section or example is a modification, detailed description, supplementary description, or the like of a part or all of another section or example. In the following description, when a number or the like (including a number, a numeric value, an amount, a range, and the like) of an element is referred to, the number or the like is not limited to a specific number, and may be equal to and greater than, or equal to and smaller than the specific number, unless otherwise specified or clearly limited to the specific number in principle.

The present system may be a physical computer system (one or more physical computers) or a system constructed on a calculation resource group (a plurality of calculation resources) such as a cloud infrastructure. The computer system or the calculation resource group includes one or more interface devices (including, for example, a communication device and an input and output device), one or more storage devices (including, for example, a memory (main storage) and an auxiliary storage device), and one or more processors.

When a function is implemented by a processor executing a program, since predetermined processing is executed appropriately using a storage device and/or an interface device, etc., the function may be at least a part of the processor. The processing described with the function as a subject may be processing executed by a processor or a system including the processor. The program may be installed from a program source. The program source may be, for example, a program distribution computer or a computer-readable storage medium (for example, a computer-readable non-transitory storage medium). The description of each function is an example, and a plurality of functions may be combined into one function, or one function may be divided into a plurality of functions.

Overview

The following description discloses a technique of generating a candidate idea whose quality is to be evaluated in the next trial. The idea may be expressed in various expression formats. A chemical structural formula and experimental conditions in material development are one form of the idea to be tested next. An expression format of the chemical structural formula may be, for example, a character string or a matrix described according to a certain grammatical rule. An example of the grammatical rule is a simplified molecular input line entry system (SMILES). In an example described below, the SMILES is used as an example of the grammatical rule describing the chemical structural formula.

A report (document) prepared in a research and development strategy is one form of an idea indicating guidelines to be researched and developed next. A sentence included in a document or a vector expression obtained after performing a morphological analysis on the sentence is also one form of the idea.

FIG. 1 shows an example of a logical configuration of a candidate idea proposal system according to an embodiment of the present description. The candidate idea proposal system includes a candidate idea generation device M01, a data storage device M02, and a user interface M05. These devices can communicate with one another via a network. The candidate idea generation device M01 generates a candidate idea to be proposed to a user. The candidate idea generation device M01 includes an idea vectorization module P01, an idea contraction module P02, a contracted space search module P03, and a candidate idea generation module P04.

The data storage device M02 stores data referred to or generated by the candidate idea generation device M01. In the configuration example in FIG. 1, the data storage device M02 stores various databases. Specifically, an idea expression database DB01, an idea vector database DB02, a contracted vector database DB03, a candidate idea database DB04, a model database DB05, and a parameter database DB06 are stored. The data storage device M02 further manages databases DB01 to DB06. A data management module P06 is provided.

The user interface M05 allows the user to input data and presents information to the user. The user interface M05 includes a display unit P07 and an input reception unit P08. The display unit P07 presents, to the user, information generated by the candidate idea generation device M01, for example. The input reception unit P08 receives, from the user, information necessary for the candidate idea generation device M01 to execute processing, for example.

The idea vectorization module P01 of the candidate idea generation device M01 converts an idea expression expressed in a predetermined format into a real number vector, that is, an idea vector, according to a predetermined method.

The idea contraction module P02 converts the idea vector from the idea vectorization module P01 into another real number vector, that is, a contracted vector. The idea contraction module P02 converts a similarity of one or more index values preset by the user so as to correspond to a distance in a multivariate space constructed by the contracted vector. For example, the idea contraction module P02 converts the multivariate space formed by the contracted vector such that a similarity of the input idea vector is correlated with the similarity of the index value of a quality of the idea.

The idea contraction module P02 may include, for example, one variable auto-encoder (VAE). The VAE is a type of auto-encoder, and is a deep generative model including two neural networks of an encoder and a decoder. The encoder converts an input (vector) into a real number vector. A space to which the real number vector belongs is called a latent space, and is assumed to follow a predetermined distribution, for example, a normal distribution. The decoder inversely converts the real number vector and outputs a vector having the same dimension as the input.

General encoders and decoders are trained (learn) to keep an input and an output equal. A fact that an input can be reconstructed from a real number vector of an intermediate output means that a sufficient feature of the input is reflected in the real number vector. A dimension of the latent space is set to be smaller than a dimension of the input. Therefore, the encoder can extract a feature of the input and compress the dimension of the input.

The vector of the intermediate output is called a latent variable or a latent vector, and is an abstract expression representing a feature extracted from the input idea vector. Therefore, the latent vector of the VAE is the contracted vector. The latent vector is assumed to follow a predetermined distribution, for example, a Gaussian distribution. Therefore, for example, when the decoder receives a noise-added vector, the decoder can restore the input vector with high accuracy. As described above, the VAE has high robustness as the generative model.

In a learning (training) process in which the VAE constructs the latent space, parameters of the neural network are sequentially optimized such that an output value of a loss function (loss) becomes small. Generally, training is performed to reduce an error between the input and the output, that is, a reconstruction error. In the embodiment of the present description, a loss function in which another term is added to a reconstruction error is defined.

First, the loss function includes a term representing a similarity between one or more predetermined components in the latent vector and a predetermined index value, such as an index value indicating the quality of the idea. The term representing the similarity may be, for example, a term representing a correlation or a term representing a Euclidean distance from specific data. For example, a term that reduces the loss as a value representing the correlation increases is added to the loss function. The latent space of the VAE trained using the loss function is a multivariate space in which both the similarity between the input idea vector and the corresponding output vector and the similarity between the predetermined component in the latent vector and the predetermined index value are maintained.

In addition, by adding a term corresponding to a search purpose of a candidate idea to the loss function, the latent space reflecting a desired similarity can be constructed by the VAE. For example, when an index value (true value) of an actual quality of a candidate idea proposed by the present system in the past is known, an error between a quality (predicted value) of the idea predicted at the time of proposal and the true value of the index value can be added to the loss function. Accordingly, a latent space reflecting a similarity between the predicted value and the true value can be constructed, and thus a region in which the prediction is likely to deviate greatly can be avoided in advance.

Further, instead of the true value obtained by experiment, a predicted value determined by a machine learning system trained based on another data set or a theoretical value calculated by theoretical calculation based on physics or chemistry may be used.

The contracted space search module P03 may also find, in the multivariate space constructed by the contracted vector, a desirable contracted vector by searching, based on a gradient method, the vicinity of the contracted vector corresponding to a target value, for example, a known idea having the highest quality at the time of searching. As described above, since the predetermined component in the latent vector and the index value of the idea quality are correlated with each other, it is possible to implement a search based on the gradient method along an axis by changing the predetermined component by a predetermined method. For example, a predetermined value is added to or subtracted from the predetermined component.

The candidate idea generation module P04 receives the contracted vector found by the contracted space search module P03 and converts the vector into an output format preset by the user. For example, the contracted vector is first inversely converted into an idea vector, and then sequentially inversely converted into an idea expression. Accordingly, the contracted vector is restored to the same expression format as the input idea expression and is converted to an expression format that the user can understand.

The embodiment of the present description mainly executes the following steps. First, the system receives user settings and data, and executes the idea vectorization module P01. Subsequently, the system learns the VAE constituting the idea contraction module P02. When learning of the VAE is completed, the system generates candidate ideas whose quality is to be evaluated next by the contracted space search module P03 and the subsequent candidate idea generation module P04. The generated candidate ideas are presented to the user via the user interface M05.

The learning of the VAE is performed first when the present system operates. In the second and subsequent searches, a step of learning may be omitted. When a new trial result of an idea is input, additional learning may be performed using the data.

When the present system is operated, a true value of an index value of a quality of the idea proposed in the past can be obtained. At this time, the user can input the true value to the present system via the user interface M05. The data management module P06 has a function of searching the stored idea and a function of receiving and storing an input of an actual index value of the quality of the candidate idea.

FIG. 2 shows a hardware configuration example of the candidate idea generation device M01, the data storage device M02, and the user interface M05. The candidate idea generation device M01 includes a processor U111 having arithmetic performance, and a DRAM U112 that provides a volatile temporary storage area for storing data and programs to be executed by the processor U111.

The candidate idea generation device M01 further includes a communication device U113 that performs data communication with other devices including other devices in the present system, and an auxiliary storage device U114 that provides a permanent information storage area using a hard disk drive (HDD) or a flash memory. In addition, the candidate idea generation device M01 includes an input device U115 that receives an operation from the user and a monitor U116 (an example of an output device) that presents an output result of each process to the user.

For example, the candidate idea generation device M01 stores programs such as the idea vectorization module P01, the idea contraction module P02, the contracted space search module P03, and the candidate idea generation module P04. The programs to be executed by the processor U111 and the data to be processed are loaded from the auxiliary storage device U114 to the DRAM U112.

Hardware elements constituting the data storage device M02 may be similar to those of the candidate idea generation device M01. For example, the data storage device M02 stores various databases DB01 to DB06 and a program such as the data management module P06 shown in FIG. 1, and executes the data management module P06. Hardware elements constituting the user interface M05 may be similar to those of the candidate idea generation device M01. For example, the user interface M05 executes the display unit P07 and the input reception unit P08.

Functions distributed to a plurality of devices may be integrated into one device, and the functions of the plurality of devices may be distributed to more devices. As described above, the candidate idea proposal system includes one or more storage devices and one or more processors.

Embodiment 1

A structural formula of a candidate compound to be tested next is searched and presented in Embodiment 1. The user can set the parameter database DB06 via an input device of any apparatus. The parameter database DB06 stores data necessary for processing of the candidate idea generation device M01.

The parameter database DB06 may include, for example, information referred to by the idea vectorization module P01 to generate an idea vector. As an example, lexical information for converting a chemical structural formula expressed by the SMILES notation into a matrix is included. The parameter database DB0 may include configuration information on the idea contraction module P02. Specifically, the parameter database DB06 describes a structure and training parameters of the idea contraction module P02.

FIG. 3 shows an example of the parameter data included in the parameter database DB06. For example, "Table-Names" in a section 61 indicates a table that stores lexical information for converting a chemical structural formula expressed by the SMILES notation into a matrix. "Target-Properties" in a section 62 indicates parameters for property values (objective variables) indicating a quality of a compound. Specifically, property values for mwt and lop P are shown. These property values are referred to in learning of the idea contraction module P02 and in searching for a contracted vector by the contracted space search module P03.

"VAEInitialParams" in a section 63 indicates parameters of a network configuration of the idea contraction module P02. Since the idea contraction module P02 in this example includes the VAE, configuration parameters of the VAE are shown. For example, "CorrDimIndex" defines which dimension has a correlation, and "CorrDir" defines which of positive or negative directions is desirable to bias.

"SearchParams" in a section 64 indicates parameters referred to in the searching for the contracted vector by the contracted space search module P03. In this example, conditions for filtering the presented candidate contracted vector are shown.

The idea expression database DB01 will be described. The user can store data in the idea expression database DB01 via the user interface M05. The idea expression database DB01 contains information on past experimental conditions and experimental results. The idea expression database DB01 stores ideas that have been tried so far. What kind of idea is tried and what kind of KPI is obtained are accumulated in association with each other. For example, experimental data is applicable in material development.

FIG. 4 shows a configuration example of the idea expression database DB01. In the example shown in FIG. 4, in an ID column T1C1, an identifier of a record is shown. In a SuggestID column T1C21, an identifier of a candidate idea proposed by the present system in the past is shown. This column T1C21 is associated with a SuggestID column T4C1 of the candidate idea database DB04. In the Suggest ID column T1C21, a blank or a symbol "-" indicating a blank is input for an experiment that has not been presented in the past. As described above, the idea expression database DB01 stores both materials (experimental results) proposed in the past and materials (experimental results) not proposed in the past.

In a TimeStamp column T1C2, a date of an experiment is shown. In an mwt column T1C3, a molecular weight is shown. In this example, a molecular weight is one of objective variables to be improved, and a larger value is desirable. In a log P column T1C4, a water partition coefficient is shown. In this example, log P is one of the objective variables to be improved, and a smaller value is desirable. In a SMILES column T1C5, a chemical structural formula expressed by the SMILES notation is shown. In a catalyst column T1C6, a catalyst which is one of the experimental conditions is shown. In a temp column T1C7, a synthesis temperature which is one of the experimental conditions is shown.

The idea expression database DB01 includes columns for estimated values showing properties of a compound. As will be described later, the VAE of the idea contraction module P02 receives a property value of the compound as an input and outputs a predicted value of the property value.

Specifically, in a pred_mwt column T1C8, a predicted value of mwt of the candidate idea proposed by the present system in the past is shown. A "pred_log P" is a predicted value of log P of the candidate idea proposed by the present system in the past. In a "pred_catalyst" column T1C10, a predicted value of a catalyst when the present system proposed an idea as the candidate idea in the past is shown. In a "pred_temp" column T1C11, a predicted value of temp of the candidate idea proposed by the present system in the past is shown. In columns T1C8 to T1C11 including pred_, a blank or a symbol "-" indicating a blank is input for an experiment that has not been proposed in the past.

As described above, in the configuration example shown in FIG. 4, identification information such as the ID and the TimeStamp (experiment date), structural formula information of an organic compound such as the SMILES, processing condition information such as the catalyst and the temp, and KPIs (objective variables) such as the mwt and the log P is described. One or more KPIs (objective variables) can be set. By setting a plurality of KPIs, a candidate idea conforming to the KPIs can be proposed.

Next, processing of the idea vectorization module P01 will be described. The idea vectorization module P01 generates the idea vector database DB02 from the idea expression database DB01.

FIG. 5 shows a configuration example of the idea vector database DB02. The idea vector database DB02 includes an idea_vector column T2C5 in addition to data of the idea expression database DB01. In the idea_vector column T2C5, a vector of an idea expression, in this example, a vector of a chemical structural formula expressed by the SMILES notation is shown.

FIG. 6 is a flowchart of a processing example of the idea vectorization module P01. The idea vectorization module P01 reads parameter data from the parameter database DB06. Subsequently, idea expression data is read from the idea expression database DB01 (S101).

Subsequently, the idea vectorization module P01 converts a chemical structural formula expressed by the SMILES notation into a vector (matrix) using lexical information described in the parameter data. The matrix and the vector are examples of an expression method of an array, and the same array can be expressed by the vector and the matrix. For example, a method widely known as one-hot encoding can be used as this conversion method. According to this method, the chemical structural formula and the vector correspond to each other on a one-to-one basis, and can be inversely converted.

Subsequently, the idea vectorization module P01 duplicates the idea expression database DB01, adds the idea_vector column T2C5, stores a corresponding converted vector, and writes it out as the idea vector database DB02.

FIG. 7 shows an example of generating a structural formula vector, which is an idea vector, from a chemical structural formula, which is an idea expression. The idea vectorization module P01 converts a chemical structural formula expressed by the SMILES notation into a vector by one-hot encoding.

Next, processing of the idea contraction module P02 will be described. The idea contraction module P02 generates the contracted vector database DB03 from the idea vector database DB02.

FIG. 8 shows a configuration example of the contracted vector database DB03. The contracted vector database DB03 includes an abst_vector column T3C5 in addition to data of the idea vector database DB02. The abst_vector column T3C5 stores a contracted vector of an idea vector. In this example, the idea vector is a vector representing a chemical structural formula expressed by the SMILES notation.

FIG. 9 is a flowchart showing a processing example of the idea contraction module P02. The idea contraction module P02 first reads parameter data from the parameter database DB06 (S151). Further, the idea contraction module P02 reads model data from the model database DB05 (S152). Further, the idea contraction module P02 reads idea vector data from the idea vector database DB02 (S153).

Subsequently, the idea contraction module P02 instantiates a VAE model (S154). If a trained model is stored, the trained model is instantiated. If a trained VAE is not stored, the idea contraction module P02 initializes the (neural network) VAE using an initial value described in the parameter data.

FIG. 10 shows a configuration example of the VAE. The encoder of the VAE may include, for example, an outer encoder 211 and an inner encoder 212 in a subsequent stage. The outer encoder 211 may include a plurality of one-dimensional convolutional layers, and the inner encoder 212 may include a plurality of fully connected layers. The encoder receives, as input data 201, a vector 202 of a chemical structural formula that can be represented by an M×N-dimensional matrix and a vector 203 obtained by connecting explanatory variables other than the SMILES. The encoder of the VAE converts the input data 201 into an L×1-dimensional vector 214 (hereinafter, simply referred to as an L-dimensional vector). The vector 214 is a contracted vector in a latent space 213.

The encoder generates a vector V1 by connecting an output vector of a last layer of the outer encoder 211 (convolutional layers) and a vector obtained by connecting explanatory variables other than the SMILES included in the idea vector database DB02. The encoder inputs the vector V1 to the inner encoder 212 (fully connected layers) following the last layer of the convolutional layers to generate the L-dimensional vector 214.

In this example, the mwt and the log P, which are KPIs, and the catalyst and the temp, which are experimental conditions, are included in the vector 203 (vector V1) and input to the inner encoder 212 in the encoders. In this way, it is possible to encode the property values and the experimental conditions. In other configuration examples, input data may not include an explanatory variable other than the SMILES if estimated property values or the like of a compound are unnecessary.

The decoder may include, for example, an inner decoder 215 and an outer decoder 216 in a subsequent stage. The inner decoder 215 may include a plurality of fully connected layers, and the outer decoder 216 may include a recurrent neural network (RNN). The decoder receives the L-dimensional vector 214 as an input and inversely converts the L-dimensional vector 214 into a vector 222 representing a chemical structural formula corresponding to an M×N-dimensional matrix and a vector 223 including explanatory variables other than the chemical structural formula. The output chemical structural formula 222 may be slightly different from the input chemical structural formula. In addition to the chemical structural formula 222, the output data 221 includes the predicted value 223 including the explanatory variables other than the input chemical structural formula.

Since the encoder also encodes explanatory variables other than a matrix converted from the SMILES, the output vector V2 of the last layer of the fully connected layers is divided. Accordingly, the restored explanatory variables such as (predicted values of) the mwt, the log P, the catalyst, and the temp can also be obtained. A coupling position of V1 and a dividing position of V2 coincide with each other.

One of divisions is input to the outer decoder 216, and the vector (matrix) 222 indicating a chemical structure is output. The other is output as the predicted value 223 of an input variable other than the chemical structure. FIG. 10 shows an example of a model for the idea contraction module P02 to form a contracted vector, and any model can be used according to a design.

With reference back to FIG. 9, in steps after step S155, recursive processing (learning processing) based on batch processing generally used in deep learning continues. That is, training data is processed by an amount of data specified by a batch size every time. A period until all batches are processed once is referred to as one epoch, and actual learning is repeated in a plurality of epoch. Processing executed in one batch will be described below.

First, the idea contraction module P02 inputs idea vectors to be learned to the VAE by the number of batches (S155). A reconstruction error U0 is calculated from the error between an input of the encoder and an output of the decoder (S156). The reconstruction error U0 may be calculated using any method, and for example, an average value of errors between the input and output of the VAE for each sample included in the batch. As in this example, when the VAE including not only the SMILES but also the property values (mwt, log P) and the experimental conditions (catalyst, temp) learns, the reconstruction error including that part is calculated.

Next, the idea contraction module P02 calculates a correlation coefficient between a predetermined component of an idea contraction vector and the objective variable (KPI) (S157). For example, the idea contraction module P02 calculates a correlation coefficient R0 between a predetermined first component of an output vector (contracted vector) of the encoder and the mwt. Next, a correlation coefficient R1 between a predetermined second component of an output vector (contracted vector) of the encoder and the log P is calculated.

Which objective variable is to be correlated with which component is specified by "CorrDimIndex" in the parameter data. A correlation may be calculated using any method. For example, a kernel function for calculating the correlation may be defined, a correlation coefficient calculated based on a covariance and an average may be used, or a product sum of a correlation coefficient and a weight calculated by different methods may be used.

Subsequently, the idea contraction module P02 calculates an error (difference) between a true value of a property value and a predicted value. The true value is an input to the VAE, and the predicted value is an output. For example, the idea contraction module P02 calculates a difference between a value in the mwt column T1C3 and a value in the pred_mwt column T1C8 of the idea vector database DB02, and a difference between a value in the log P column T1C4 and a value in a pred_log P column T1C9, and calculates a sum W0 thereof (S158).

The sum W0 is, for example, a sum of differences between property values of a plurality of samples. The sum of the differences between different property values may be a simple sum or a sum obtained by multiplying by a weight designated by the parameter data. Calculation of the error W0 of the property values (mwt, log P) may be omitted. In this configuration, input data and output data of the VAE may not include the property values (KPIs). The experimental conditions can be omitted because the error is not included in a Loss function.

Subsequently, the idea contraction module P02 calculates a loss "Loss" based on a sum of the reconstruction error U0, the correlation coefficient R0, the correlation coefficient R1, and the difference W0 between the true value and the predicted value of the objective variable. Since the neural network learns so as to reduce the Loss, a sign is appropriately set. For example, signs R0 and R1 are preset by "CorrDir" in the parameter data.

Based on the Loss, the idea contraction module P02 updates the VAE so as to optimize the parameters (S159). In this example, the parameters of the VAE are updated such that the reconstruction error U0 and the property value error W0 become smaller and the correlations R1 and R2 become larger. A sign of the variable in the Loss function is determined by design, and for example, the sign may be determined such that the Loss function becomes smaller when the correlation becomes smaller.

Next, the idea contraction module P02 determines whether the learning ends (S160). In this example, an end flag is set when the learning processing is completed for a predetermined number of epochs. Otherwise (S160: NO), the processing returns to step S155 and continues.

After the learning processing ends (S160: YES), the idea contraction module P02 writes and stores parameters of a trained model in the model database DB05 (S161).

Subsequently, the idea contraction module P02 receives all idea vectors of the trained VAE again, acquires outputs of the encoder, and converts the vectors into contracted vectors (S162).

Subsequently, the idea contraction module P02 adds the abst_vector column T3C5 to a configuration of the idea vector database DB02, stores the contracted vectors, and writes this table as the contracted vector database DB03 (S163).

Next, processing of the contracted space search module P03 will be described. FIG. 11 is a flowchart showing a processing example of the contracted space search module P03. The contracted space search module P03 first reads parameter data from the parameter database DB06 (S201). Subsequently, the contracted space search module P03 reads the contracted vector database DB03 (S202).

Subsequently, the contracted space search module P03 extracts a contracted vector serving as a search center from the contracted vector database DB03 based on a search condition described in the parameter data (S203). In the example shown in FIG. 3, a target value of each objective variable is described in "TargetValue" in the section 62 in the parameter data.

Therefore, a sample (record) in which the mwt is close to 1.6 and the log P is close to −1.5 is extracted in the contracted vector database DB03. A predetermined range indicating a degree of closeness for extraction is specified by "FilteringRange" in the parameter data. The number of extractions is as desired, and may be specified by the parameter data. A record in which at least one of the mwt and the log P is close to a target value may be extracted, or a record specified by a reference different from the target value, for example, a record specified by the user, may be extracted.

Subsequently, the contracted space search module P03 generates a new contracted vector by applying a minute real number as a predetermined bias to a first component and a second component of the extracted contracted vector (S204). A value of an objective variable of the new contracted vector is slightly different from a value of an objective variable of the original contracted vector. The number of bias sets including biases for one or more components, to be applied to the contracted vectors, may be one or two or more. A plurality of new contracted vectors can be generated from the contracted vectors by applying different bias sets to the contracted vectors.

The bias to be applied to each component may be a preset value, and one or different biases may be added to each extracted contracted vector. The bias set to be applied may be common or different for different components. The extracted contracted vectors and the contracted vectors newly generated due to the bias are candidates for a compound (idea) to be presented to the user.

Subsequently, the contracted space search module P03 extracts all or a part of records in which valid values are stored in the SuggestID column T1C21 of the contracted vector database DB03. These records are records proposed in the past.

The contracted space search module P03 calculates a similarity between each contracted vector in the extracted or generated contracted vectors and each contracted vector in the extracted proposed records. The similarity is represented by, for example, a Euclidean distance. In one example, values of a component 0 and a component 1 are removed from calculation of the similarity. These values may be included in the calculation of the similarity. Further, the contracted space search module P03 filters the contracted vectors extracted based on the target value and the newly generated contracted vectors using the calculated similarity (S205).

In this example, the novelty of a candidate idea is emphasized, and filtering is executed such that a contracted vector separated from all the proposed ideas by a predetermined threshold or more remains. The threshold is specified by "threshold" in the parameter data. Accordingly, a compound (idea) whose objective variable (KPI) is in the vicinity of the target value and that is separated from the proposed compound (idea) can be selected.

Subsequently, the contracted space search module P03 refers to the TimeStamp column T1C2 of the contracted vector database DB03 and extracts records within a certain period from the current date and time.

The contracted space search module P03 calculates a similarity between a contracted vector included in each of extracted records and a candidate contracted vector selected by the filtering. As described above, the similarity can be represented by, for example, a Euclidean distance. Calculation of the similarity may be the same or different between the presented idea and the latest idea. The contracted space search module P03 executes filtering using the similarity, and selects a part of the candidate contracted vectors (S206).

In this example, the chronological novelty of a candidate idea is emphasized, and filtering is executed such that a candidate contracted vector separated from all records within a certain period from the current date and time by a threshold or more remains. The threshold may be specified by "threshold Time" in the parameter data, and 30 days are set in this example. Filtering may be executed based on only one of the similarity to the presented idea and the similarity to the latest idea, or filtering may be executed independently.

Subsequently, the contracted space search module P03 transmits the candidate contracted vector remaining after the filtering to the candidate idea generation module P04 (S207).

Processing of the candidate idea generation module P04 will be described below. The candidate idea generation module P04 generates a candidate idea and stores the candidate idea in the candidate idea database DB04.

FIG. 12 shows a configuration example of the candidate idea database DB04. In the example shown in FIG. 12, in the SuggestID column T4C1, an ID of a proposed idea is shown. In a SuggestDate column T4C2, a proposal date is shown. In a pred_mwt column T4C3, a predicted value of mwt of a candidate idea is shown. In a pred_log P column T4C4, a predicted value of log P of the candidate idea proposed by the present system in the past is shown.

In a SMILES column T4C5, the SMILES notation of a candidate compound (candidate idea) proposed by the present system as the candidate idea in the past is shown. In a pred_catalyst column T4C6, a predicted value of a catalyst when the present system has proposed an idea as the candidate idea in the past is shown. In a pred_temp column T4C7, a predicted value of temp of the candidate ideas proposed by the present system in the past is shown. Each of the columns T41C to T4C2 is associated with a column having the same name in the idea expression database DB01, and values of the same proposal are the same.

FIG. 13 is a flowchart of a processing example of the candidate idea generation module P04. The candidate idea generation module P04 first reads parameter data (S251), and then receives a contracted vector, which is an abstract expression of a candidate idea, from the contracted space search module P03 (S252).

Subsequently, the candidate idea generation module P04 reads a trained model from the model database DB05 (S253). The model read here is the same as the VAE used in the idea contraction module P02.

Subsequently, the candidate idea generation module P04 inputs the contracted vector from the contracted space search module P03 to the decoder of the trained VAE to obtain a matrix that is an idea vector (S254). In this example, the idea contraction module P02 encodes the properties including the mwt and the log P, and the experimental conditions including the catalyst and the temp, which are explanatory variables other than the SMILES. Therefore, the candidate idea generation module P04 divides the intermediate output vector V2 to obtain outputs of the mwt and the log P, and the catalyst and the temp. This processing is not executed when only the SMILES is encoded.

Subsequently, the candidate idea generation module P04 inversely converts the inversely converted idea vector into an idea expression according to a predetermined method (S255). In this example, a chemical structural formula expressed by the SMILES notation, which is an idea expression, is obtained by one-hot decoding the decoded matrix.

Subsequently, the candidate idea generation module P04 collects the decoded SMILES, the property values, and the experimental conditions, and stores those in the candidate idea database DB04 as new records. At this time, a uniquely determined identifier is added to the SuggestID column 4T1C, and an execution date and time is added to the SuggestDate column T4C2.

The candidate idea generation module P04 displays the updated data added to the candidate idea database DB04 via the display unit P07 of the user interface M05, and presents a candidate idea to the user.

Embodiment 2

Hereinafter, an example of a candidate idea generation system based on a document analysis technique will be disclosed as Embodiment 2. Various documents such as patent documents, academic papers, and internal reports, as well as sentences, which are components in each document, are also expression forms of ideas. According to the present system, it is possible to generate and present a new candidate idea based on the known idea, thereby supporting the user to think out an idea.

For example, a system that supports human in idea organization is considered. A process in which people organize ideas can be regarded as a process in which an abstract image is verbalized. Then, an idea that is successfully verbalized such that anyone can understand by reading can be positioned as an organized idea. That is, the following system that appropriately supports phrase selection for explaining an implicit idea in the head of the user is considered.

FIGS. 14A and 14B show examples of a user interface (screen) of an idea generation support application according to Embodiment 2. After a user operation on a screen H10A shown in FIG. 14A, a user operation on a screen H10B shown in FIG. 14B is performed.

On the screen H10A, in an object H13, a keyword "You hold in hand" is shown. In the object H13, four types of keywords are lined up as word cards. These keywords are the most likely word group at the present time for explaining an idea of the user.

The system presents a new word (word card) in a "new word" object H12. The user first evaluates whether the currently held cards are sufficient to verbalize the idea, and inputs a result to the system by selecting a button indicated by "description degree of currently held card" H11 in a 5-grade evaluation, for example.

Thereafter, the user compares the held words with the new word, selects a word card most unrelated to the idea of the user, and presses a "next" button H14 to perform an operation of discarding the selected word card. After replacing the word card as necessary, the system displays the next screen H10B shown in FIG. 14B.

The system displays a new word card in the "new word" object H12 on the screen H10B shown in FIG. 14B. The object H13 indicates the keyword "You hold in hand". Similarly to the operation described with reference to FIG. 14A, the user evaluates whether the currently held cards are sufficient to verbalize the idea, and inputs a result to the systems by selecting a button indicated by "description degree of currently held card" H11 in the 5-grade evaluation. The user compares the held words with the new word, selects a word card most unrelated to the idea of the user, and presses the "next" button H14 to perform an operation of discarding the selected word card. After replacing the word card as necessary, the system displays a next screen (not shown).

The held word group and the user evaluation on the word group are recorded for each step and stored in an evaluation result table. FIG. 15 shows a configuration example of an evaluation result table T60. In a step column T6C1, an identifier of a step of the user evaluation is shown.

In a word column T6C2, a held word group in each evaluation step is shown. A vector representing the word group is an example of a word vector. This word vector indicates the presence or absence of a word included in the held words in the evaluation step by 0 and 1.

In an evaluation index column T6C3, an evaluation result of the evaluation step is shown. The evaluation index column T6C3 includes a difference evaluation column T6C5 and an absolute evaluation column T6C6. The user evaluation of each evaluation step input on the evaluation screen is stored in the absolute evaluation column T6C6. A difference between an absolute evaluation on a word vector in a previous step and an absolute evaluation on a next word vector is stored in the difference evaluation column T6C5.

By repeating the evaluation on the word group described with reference to FIGS. 14A and 14B, the user can hold word cards suitable for describing the idea in hand, and can promote verbalization of the idea.

In order to implement the above operation, the idea vectorization module P01 according to Embodiment 2 receives an idea expression having a single sentence or a plurality of sentences as one unit, and converts the idea expression into an idea vector, which is a real number vector. For example, Word2Vec or Doc2Vec is widely known as a method of converting the expression of the natural language into the real number vector.

Alternatively, a method is known in which words having a strong relationship are extracted based on an appearance frequency or a co-occurrence probability of words appearing in a document and are converted into a real number vector as a feature. Such an idea vector directly associated with words is referred to as a word vector. FIG. 16 shows an example of a word vector T70. A document to be converted is one record (one word vector), and the one word vector indicates the presence or absence of a word included in the document by 0 and 1.

In an initial operation stage, for example, the system searches for the closest word group based on only the similarity (distance) between word vectors, and determines the next new word to be shown. For example, three records in FIG. 16 are word vector groups that differ only in component values such as 1. It is assumed that a currently held word group is a first record, and the system searches for similar word vectors and extracts second and third records. The system randomly selects the third record therefrom, and presents a difference "resolution" to the next new word object H12.

When the system has been operated a certain number of times, pairs of word vectors and user evaluations, that is, a large number of records in FIG. 15 are accumulated. The evaluation result table T60 in FIG. 15 is an example of the idea vector database DB02. The idea contraction module P02 in Embodiment 2 may use the VAE as in Embodiment 1. The idea contraction module P02 receives a word vector as an input, and learns a network using a loss function that strengthens a correlation between a predetermined component of a contracted vector obtained by the encoder and a user evaluation value.

Then, as in Embodiment 1, the contracted space search module P03 can search for a useful word vector contributing to idea organization. Since a new word vector can be obtained by the candidate idea generation module, it is possible to support thinking according to the habit and interest of the user.

Instead of the user evaluation, any index value may be used as long as the index value relates to a quality of an idea, such as an evaluation value for a document serving as a source for generating a word vector or an evaluation from another user.

Further, idea vector databases of a plurality of users can be integrated. By causing an acquisition idea contraction module to learn a thinking process of another person as information, it is also possible to support transition of thinking inspired by an idea of another person, that is, idea change.

The invention is not limited to the examples described above, and includes various modifications. For example, the examples described above are described in detail for easy understanding of the invention, and the invention is not necessarily limited to those including all configurations described above. A part of a configuration of one example can be replaced with a configuration of another example, and a configuration of another example can be added to the configuration of the one example. In addition, a part of a configuration of each example may be added to, deleted from, or replaced with another configuration.

Some or all of the configurations, functions, processing units, and the like described above may be implemented by hardware through design using an integrated circuit, for example. The configurations, functions, and the like described above may also be implemented by software when a processor interprets and executes a program for implementing each function. Information such as a program, a table, and a file for implementing each function can be stored in a recording device such as a memory, a hard disk, and a solid state drive (SSD), or a recording medium such as an IC card and an SD card.

In addition, control lines and information lines that are considered to be necessary for description are shown, and not all the control lines and information lines are necessarily shown on a product. Actually, it may be considered that almost all the configurations are interconnected.

The invention claimed is:

1. A system for generating a candidate idea, the system comprising:
   one or more processors; and
   one or more storage devices configured to store programs to be executed by the one or more processors, wherein the one or more processors
      convert a first input idea vector into a first contracted vector belonging to a multivariate space using a trained model,
      extract one or more second contracted vectors from the multivariate space, based on a value of a first predetermined component of the first contracted vector in the multivariate space, and
      output, respectively based on the one or more second contracted vectors, one or more first output idea vectors representing a candidate idea to be proposed to a user using the trained model, and
      wherein the trained model is trained using an objective function comprising a term representing similarity between an input idea vector and an output vector for a contracted vector and a term representing similarity between the first predetermined component and a first predetermined index value.

2. The system according to claim 1, wherein
   the one or more processors generate the one or more second contracted vectors based on the first predetermined component and a second predetermined component of the first contracted vector, and the objective function further comprises a term representing similarity between the second predetermined component and a second predetermined index value.

3. The system according to claim 1, wherein
the similarity between the first predetermined component and the first predetermined index value indicates a correlation between the first predetermined component and the first predetermined index value, and
the similarity between the input idea vector and the output idea vector is represented by a Euclidean distance.

4. The system according to claim 1, wherein
the one or more processors apply one or more predetermined biases to the first predetermined component of the first contracted vector in generating of the one or more second contracted vectors.

5. The system according to claim 1, wherein
the one or more processors select, from a plurality of ideas, an idea in which a difference between the first predetermined index value and a target value is within a predetermined range, and generate the first input idea vector from the selected idea.

6. The system according to claim 1, wherein
the one or more storage devices include a variable auto-encoder including an encoder and a decoder, and
the one or more processors
generate the one or more second contracted vectors using the encoder, and
generate the one or more first output idea vectors using the decoder.

7. The system according to claim 1, wherein
the one or more second contracted vectors are a plurality of second contracted vectors, and
in generating of the plurality of second contracted vectors, the one or more processors apply different biases to the first predetermined component of the first contracted vector for the plurality of second contracted vectors.

8. The system according to claim 1, wherein
the one or more storage devices manage a proposed idea,
the one or more second contracted vectors are a plurality of second contracted vectors, and
the one or more processors select the second contracted vector of the candidate idea to be proposed to the user, based on a similarity between a contracted vector of the proposed idea in the multivariate space and the plurality of second contracted vectors.

9. The system according to claim 1, wherein
the idea includes at least one of a material and a phrase, and
the one or more processors convert the one or more first output idea vectors into an expression representing an idea and displays the expression.

10. A method in which a system generates a candidate idea, the method comprising:
converting, by the system, a first input idea vector into a first contracted vector belonging to a multivariate space using a trained model;
extracting, by the system, one or more second contracted vectors from the multivariate space, based on a value of a first predetermined component of the first contracted vector in the multivariate space; and
outputting, by the system, respectively based on the one or more second contracted vectors, one or more first output idea vectors representing a candidate idea to be proposed to a user using the trained model,
wherein the trained model is trained using an objective function comprising a first term representing similarity between an input idea vector and an output vector for a contracted vector and a second term representing similarity between the first predetermined component and a first predetermined index value of quality,
wherein the second term represents similarity via correlation and the object function reduces loss as correlation increases.

* * * * *